United States Patent
Birkestrand et al.

(10) Patent No.: US 9,912,741 B2
(45) Date of Patent: *Mar. 6, 2018

(54) OPTIMIZATION OF COMPUTER SYSTEM LOGICAL PARTITION MIGRATIONS IN A MULTIPLE COMPUTER SYSTEM ENVIRONMENT

(71) Applicant: International Business Machines Corporation, Armonk, NY (US)

(72) Inventors: Daniel C. Birkestrand, Rochester, MN (US); Peter J. Heyrman, Rochester, MN (US); Paul F. Olsen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 416 days.

This patent is subject to a terminal disclaimer.

(21) Appl. No.: 14/600,364

(22) Filed: Jan. 20, 2015

(65) Prior Publication Data

US 2016/0212202 A1  Jul. 21, 2016

(51) Int. Cl.
*H04L 29/08* (2006.01)
*G06F 9/455* (2018.01)

(52) U.S. Cl.
CPC ...... *H04L 67/1008* (2013.01); *G06F 9/45558* (2013.01); *H04L 67/10* (2013.01)

(58) Field of Classification Search
CPC ..... H04L 67/1008; H04L 67/10; H04L 41/00; G06F 12/0811; G06F 12/1027; G06F 12/0806; G06F 9/45558; G06F 9/4557; G06F 9/45516; G06F 9/4881; G06F 9/5008; G06F 9/5016; G06F 2009/45583;

(Continued)

(56) References Cited

U.S. PATENT DOCUMENTS 7,036,609 B2    4/2006  Hiramoto
7,577,813 B2 *  8/2009  Nijhawan ............ G06F 9/5016
                                                    711/147

(Continued)

FOREIGN PATENT DOCUMENTS

JP    2003067352 A   3/2003
JP    2008186136 A   8/2008

OTHER PUBLICATIONS

Calcavecchia, "VM Placement Strategies for Cloud Scenarios",Jun. 2012, IEEE Fifth International Conference on Cloud Computing (8 pages total).*

(Continued)

*Primary Examiner* — Vivek Srivastava
*Assistant Examiner* — Todd L Barker
(74) *Attorney, Agent, or Firm* — Roy W. Truelson

(57) ABSTRACT

Workload, preferably as one or more partitions, is migrated from a source server to one or more target servers by computing a respective projected performance optimization for each candidate partition and target, the optimization being dependent on a projected processor-memory affinity resulting from migrating candidate workload to the candidate target, and selecting a target to receive a workload accordingly. A target may be pre-configured to receive a workload being migrated to it by altering the configuration parameters of at least one workload currently executing on the target according to the projected performance optimization.

2 Claims, 9 Drawing Sheets

(58) Field of Classification Search
CPC ... G06F 2009/4557; G06F 2009/45579; G06F 11/3433; G06F 11/3476; G06F 11/3495; G06F 2201/86; G06F 2201/88; G06F 2201/508; G06F 2212/2542
See application file for complete search history.

(56) References Cited

U.S. PATENT DOCUMENTS

| | | |
|---|---|---|
| 8,112,750 B2 | 2/2012 | Hayakawa et al. |
| 2002/0129127 A1 | 9/2002 | Romero et al. |
| 2005/0044228 A1 | 2/2005 | Birkestrand et al. |
| 2006/0020944 A1 | 1/2006 | King et al. |
| 2007/0124457 A1* | 5/2007 | May ................ G06F 11/3476 709/224 |
| 2008/0256321 A1 | 10/2008 | Armstrong et al. |
| 2008/0320269 A1 | 12/2008 | Houlihan et al. |
| 2009/0070771 A1* | 3/2009 | Yuyitung ............ G06Q 10/06 718/105 |
| 2009/0235265 A1 | 9/2009 | Dawson et al. |
| 2009/0276783 A1 | 11/2009 | Johnson et al. |
| 2010/0229175 A1 | 9/2010 | Gonzalez, Jr. et al. |
| 2011/0093861 A1* | 4/2011 | Flemming .......... G06F 9/45516 718/104 |
| 2011/0106922 A1 | 5/2011 | Bouillet et al. |
| 2011/0219371 A1 | 9/2011 | Eide et al. |
| 2012/0102258 A1* | 4/2012 | Hepkin .............. G06F 9/45558 711/6 |
| 2012/0210331 A1 | 8/2012 | Davidson, II et al. |
| 2013/0086272 A1 | 4/2013 | Chen et al. |
| 2013/0086593 A1* | 4/2013 | Sloma .................. G06F 9/505 718/105 |
| 2013/0160007 A1 | 6/2013 | Cawlfield et al. |
| 2014/0136800 A1 | 5/2014 | Birkestrand et al. |
| 2014/0237197 A1* | 8/2014 | Gray .................... G06F 3/061 711/153 |

OTHER PUBLICATIONS

Chen, "R-ECS:Reliable Elastic Computing Services for Building Virtual Computing Environment", Nov. 2009, ICIS.*
Quintero et al, "IBM Power Systems Peformance Guide Implementing and Optimizing", Feb. 2013, IBM (372 pages).*
Bueno et al, "IBM PowerVM Virtualization Managing and Monitoring", Jun. 2013 (774 pagest total).*
Alam, "Characterization of Scientific Workloads on Systems with Multi-Core Processors",2006 IEEE International Symposium on Workload Characterization, Oct. 25, 2006.*
V. Salapura et al., "Resilient cloud computing," International Business Machines Corporation, vol. 57, No. 5, Paper 10, Sep./Oct. 2013.
Milen Tilev et al., "CapSys: A tool for macroscopic capacity planning of IBM mainframe systems," ICB-Research Report No. 26, Sep. 2008.
International Business Machines Corporation, "List of IBM Patents or Patent Applications Treated as Related", filed in USPTO in present application herewith.

* cited by examiner

OPTIMIZATION OF COMPUTER SYSTEM LOGICAL PARTITION MIGRATIONS IN A MULTIPLE COMPUTER SYSTEM ENVIRONMENT

FIELD OF THE INVENTION

The present invention relates to digital data processing, and in particular to the allocation and configuration of computer system resources when migrating one or more logical partitions of a computer system to one or more other computer systems.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users. At the same time, the cost of computing resources has consistently declined, so that information which was too expensive to gather, store and process a few years ago, is no economically feasible to manipulate via computer. The reduced cost of information processing drives increasing productivity in a snowballing effect, because product designs, manufacturing processes, resource scheduling, administrative chores, and many other tasks, are made more efficient.

Early computer systems were isolated machines, in which data was input manually or from storage media and output generated to storage media or human perceptible form. While useful in their day, these systems were extremely limited in their ability to access and share information. As computers became more capable, and the ability to store vast amounts of digital data became prevalent, the desirability of communicating with other computer systems and sharing information became manifest. This demand for sharing information led to a growth of computer networks, including the Internet. It is now rare to find a general purpose computer system having no access to a network for communicating with other computer systems, although many special-purpose digital devices still operate in isolated environments.

More recently, this evolution of isolated computers to networked devices and shared information has proceeded to a further stage in digital data processing: the cloud. The "cloud" is in fact a collection of computing hardware and software resources which are accessible from remote locations to perform useful work on behalf of a client. However, except for the access point, such as a client computer terminal having limited capability, the client does not own or control hardware and software resources which provide computing services in the cloud. The cloud presents a virtualized system having the capability to provide whatever computing services are required. The client contracts to obtain the computing services. These services are provided by the virtualized system, i.e., without any specification of the particular physical computer systems which will provide the contracted service. This virtualization enables a provider of services in the cloud to re-allocate the physical computer resources as convenient, without involvement of the client. Cloud computing has thus been analogized to an electric utility, in which the customer purchases electric power without any knowledge or concern how the power is generated. Cloud computing not merely enables communications with other computing devices and access to remotely stored data, but enables the entire computing task to be performed remotely.

Although some of the concepts used in cloud computing date back to the 1950's and early time sharing systems, the use of cloud computing in a global networked environment is a relatively new phenomenon, and deployment of cloud computing on a broad scale is still in its early stages. New challenges arise as designers attempt to implement the broad concepts of cloud computing in functioning systems. Among the challenges of cloud computing is the efficient allocation of cloud resources.

For any of various reasons, it is often necessary or desirable to migrate workload in one computer system (a source) to another computer system (a target). Often, workload migration takes the form of migrating one or more logical partitions from the source to the target, the migrated partition's workload previously being performed in the source being subsequently performed in the target. For example, each client of a server may have its own logical partition within the server for one or more respective client processes, so workload is migrated by moving the workload of one or more clients, and reconstructing the partition parameters, on one or more other server systems. A partition may be migrated to balance workload among multiple systems, but may also be migrated to perform maintenance on the source system or for some other reason.

Physically, many large server systems are designed as systems having a non-uniform memory access (NUMA), in which multiple processors and main memory are physically distributed, so that each processor has some portion of main memory which is in closer physical proximity (and is accessed faster) than other portions of main memory. In such a system, it is desirable, insofar as possible, to hold instructions and other data required for executing a process or thread in the main memory portion which is physically closest to the processor executing the process or thread, a characteristic referred to as "processor-memory affinity" or "affinity".

Conventional cloud and multi-system management tools do not always optimally manage workload in a complex multi-server environment. With the growth in cloud computing and other forms of shared and distributed use of computing resources, a need exists for improved techniques for managing workload among multiple systems, and in particular, for managing the migration of workload from a source server system in a multi-server environment to one or more target server systems.

SUMMARY

In one or more aspects, workload is migrated from a source server computer system to one or more target server computer systems. For each pair of one or more candidate workload units for migration and one of multiple candidate target server computer systems, a respective projected performance optimization representing a relative projected performance optimization obtainable by migrating the respective candidate workload unit to the respective candidate target server computer system is computed, the relative projected performance optimization being dependent at least in part on a projected processor-memory affinity resulting from migrating the respective candidate workload unit to the respective candidate target server computer system. A respective target server computer system for migrating each of one or more candidate workload units is selected based on the projected performance optimization, and one or more workload units are migrated accordingly.

In one or more aspects, a target server computer system is pre-configured to receive a workload unit (which is preferably a partition) partition being migrated to it by altering the configuration parameters of at least one workload unit (which is preferably a partition) currently executing on the target according to a projected performance optimization obtainable by migrating the workload unit being migrated to the target, the projected performance optimization being dependent at least in part on a projected processor-memory affinity resulting from the migration.

In one or more embodiments, substantially all of the workload units are migrated from the source server computer system. Such an embodiment may be employed, e.g., prior to scheduled maintenance, repair, replacement, or reconfiguration of a source server computer system.

In one or more embodiments, a subset fewer than all of the workload units are migrated from the source server computer system. A respective current performance optimization figure of merit representing a relative performance optimization of the corresponding candidate workload unit as currently configured in the source server computer system is computed for each of multiple candidate workload units, and one or more workload units is selected for migration based on the current performance optimization figure of merit.

In one or more embodiments, the performance optimization is represented as a numerical figure of merit, and specifically is a memory affinity score computed according to any formula or variation thereof disclosed in copending U.S. patent application Ser. No. 13/675,701, published as U.S. Patent Publication 2014/0136800, which is herein incorporated by reference. However, a performance optimization could be computed according any of various alternative formulae or techniques or could be represented in other forms.

In one or more embodiments, the source and target servers are servers within a cloud computing environment for providing cloud computing services to multiple clients over a network, which could including the Internet. However, the source and target servers would not necessarily have to be servers within a cloud computing environment.

By intelligently selecting a target server from among multiple candidate target server systems for receiving migrated workload and/or pre-configuring the target server system to optimally process the migrated workload before migration in accordance with one or more inventive aspects, efficiency of available resources in a multiple server system environment is improved and costs/disruptions due to migration are reduced.

The details of the present invention, both as to its structure and operation, can best be understood in reference to the accompanying drawings, in which like reference numerals refer to like parts, and in which:

DETAILED DESCRIPTION

Cloud Computing Overview

Figure 1:
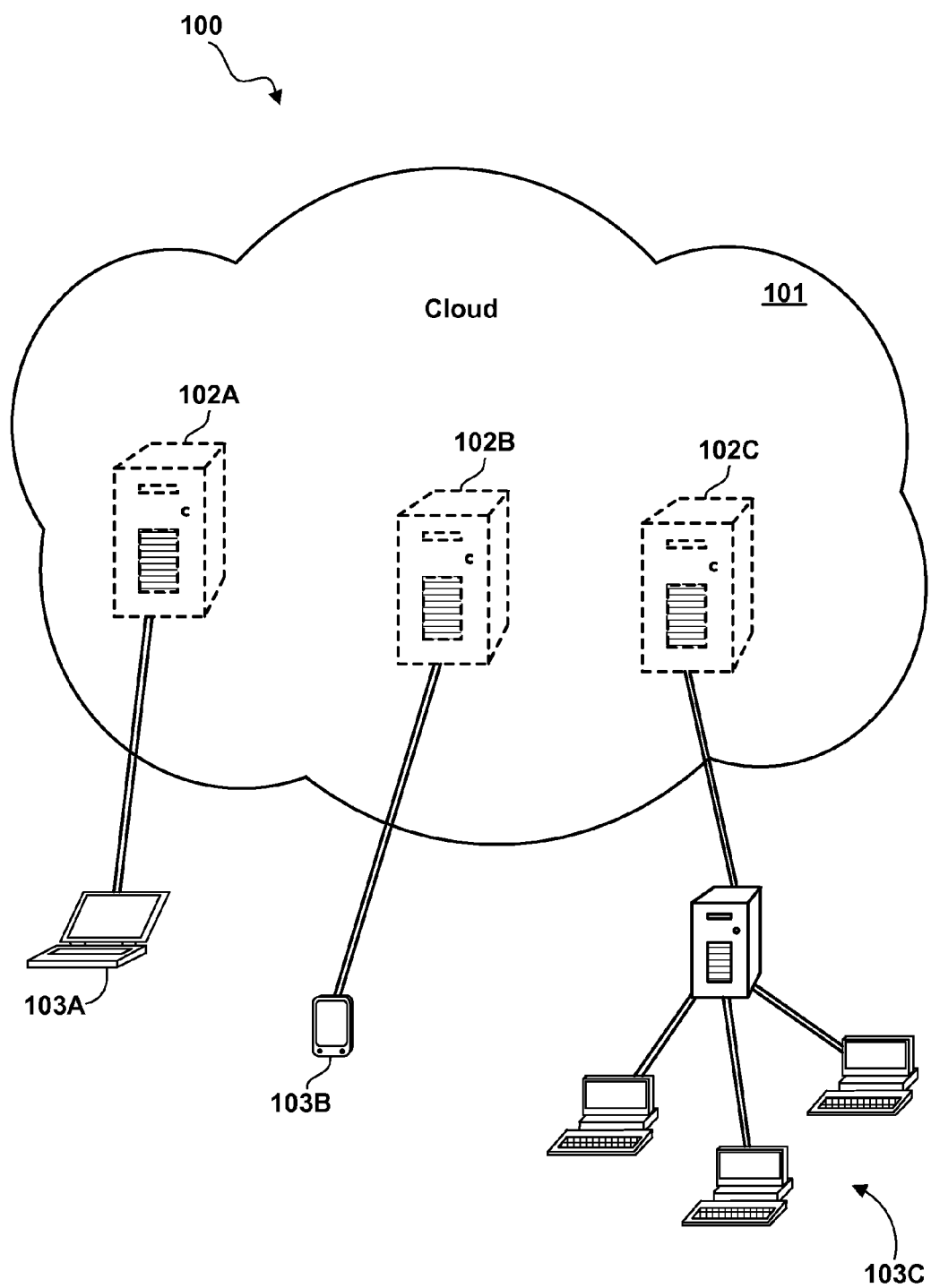
FIG. 1 is a high-level conceptual representation of a cloud computing environment from the perspective of clients who utilize cloud resources.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected digital computing devices.

Referring to the Drawing, wherein like numbers denote like parts throughout the several views, FIG. 1 is a high-level conceptual representation of a cloud computing environment 100 from the perspective of clients who utilize cloud resources. Multiple clients 103A, 103B, 103C (herein generically referred to as feature 103) access respective computing services in the cloud 101. A client could be any digital data device capable of communicating with the cloud over a network. For example, FIG. 1 represents a laptop computer system 103A, a handheld portable device 103B such as a personal digital assistant, smartphone, or the like, and a multi-user computer system 103C having multiple terminals attached thereto. However, it will be understood that these examples are not exhaustive, and any of various alternative digital data devices could be used, that such devices might be single user or multiple user, might be general-purpose programmable digital computers or special purpose digital devices, could have fixed location or movable location (including vehicular mounted devices), and so forth.

From the perspective of the client, each client device 103A, 103B, 103C obtains computing services in the cloud 101 from a respective virtual server system 102A, 102B, 102C (herein generically referred to as feature 102). Each virtual server system 102 appears to the client as a computer system having the hardware and software resources requested (either explicitly or implicitly) by the client to perform computing services on behalf of the client. Since each client is free to request services independently of any other client, each virtual server system 102 does not necessarily include, and in general will not include, identical hardware and software resources and will not be configured in an identical manner.

Multiple Computer System Networked Environment

Figure 2:
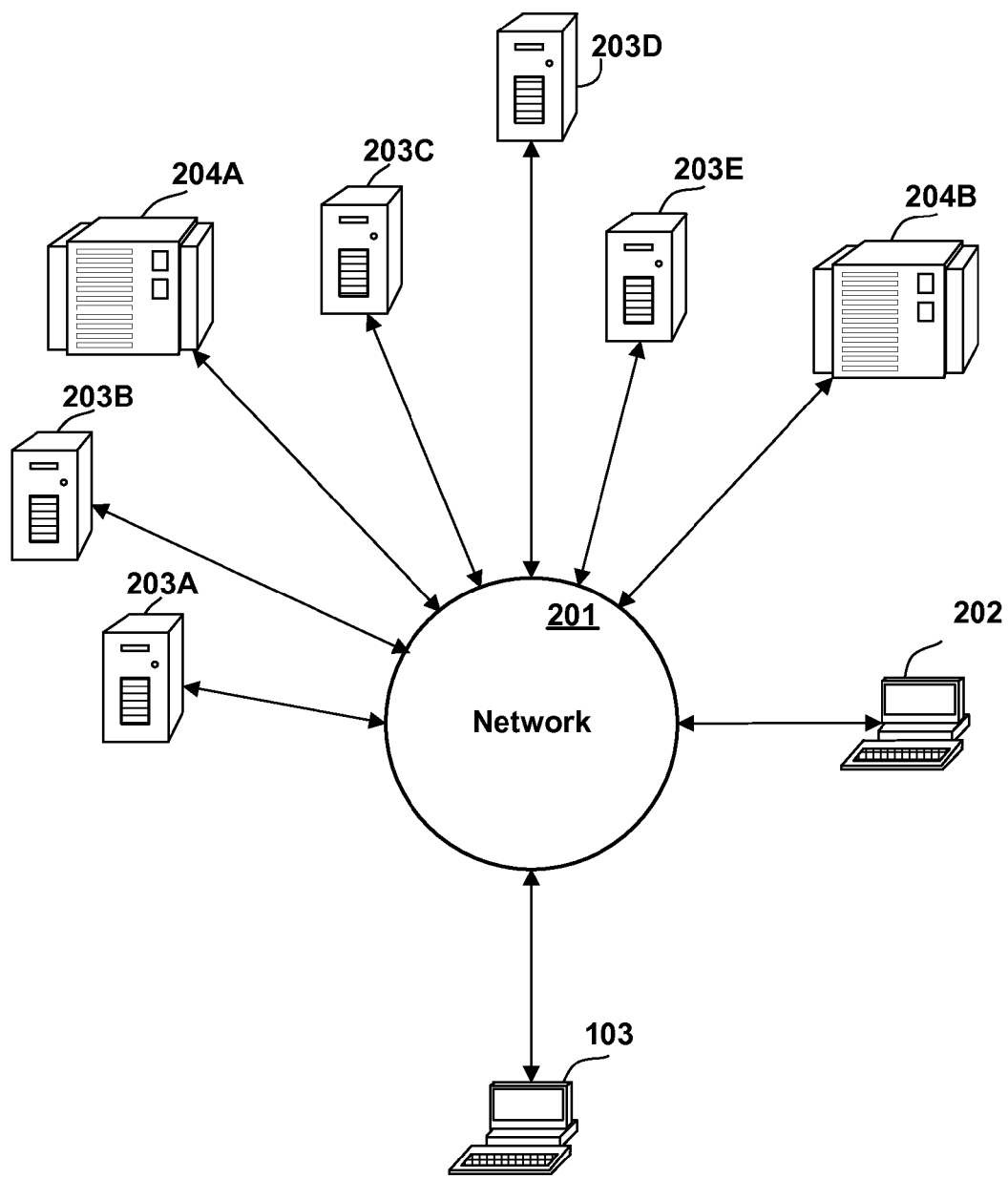
FIG. 2 is a high-level illustration of the representative major physical components which implement a multiple computer system networked environment for optimizing logical partition migrations, in accordance with one or more preferred and/or alternative embodiments of the present invention.

FIG. 2 is a high-level illustration of the representative major physical components of a multiple computer system networked environment in which migration of logical partitions is optimized, in accordance with one or more preferred and/or alternative embodiments. The networked environment may, for example, implement a private, public or hybrid cloud in which multiple clients access computing resources on multiple computers via a network, the multiple computers which provide computing resources appearing to the clients as a single conceptual entity providing resources on demand. However, a multiple computer networked environment in accordance with the present invention need not implement a cloud computing environment, and could provide some alternative form of shared computing resource or service.

As shown in FIG. 2, the multiple computer system networked environment is implemented by a collection of physical devices including a network 201 (which may in fact be configured as a collection of networks capable of communicating data among themselves), to which are coupled multiple digital data devices, as well as multiple clients (of which only one representative client 103 is illustrated in FIG. 2). The multiple digital devices preferably include a hardware management console 202 and multiple server computer systems 203A-203E (herein generically referred to as feature 203). Hardware management console 202 and server computer systems 203 are preferably general purpose digital computers, each having a respective at least one programmable central processing unit (CPU) which executes instructions storable in an addressable memory. Digital devices may further include one or more storage servers 204A-204B (herein generically referred to as feature 204) which function as shared data storage available to server computer systems 203. The networked environment may further include additional devices (not shown), such as routers and special purpose digital devices for performing accounting, maintenance, backup, and other functions.

Hardware management console 202 supports an interactive user interface enabling a system administrator or similar user to manage allocations of resources among the various digital data devices, in particular servers 203. In particular, in accordance with one or more embodiments, hardware management console 202 manages the migration of logical partitions from one server 203 to another, as described more fully herein. Hardware management console 202 may further perform other functions of managing a network of servers, such as providing a portal for client requests, assigning client requests to servers and/or logical partitions therein for execution, managing maintenance operations, configuring network connections, and so forth.

Although illustrated as a stand-alone device attached directly to network 201, hardware management console 202 may alternatively be implemented as a software program executing in one of servers 203 (preferably in its own logical partition) to which an interactive terminal is directly attached, or which is accessed by a remote terminal over network 201. The multiple computer system networked environment may include only a single hardware management console 202 as shown in FIG. 2, but may alternatively include multiple hardware management consoles which collectively support the multiple computer systems and share the tasks of managing allocation of resources, etc. Multiple hardware management consoles 202 provide redundancy and continuous operation in the event that any one console malfunctions. In the present Specification, hardware management console 202 will be described as a single computer system apart from the server systems 203, for simplicity and clarity of description, it being understood that the hardware and software components of a hardware management console 202 and their operation described herein may be embodied in and performed by one or more physical server computer systems 203 and software executing thereon.

In one or more embodiments, network 201 is or includes the Internet, and may further include other networks, such as one or more local area networks, which are coupled to the Internet and capable of communicating therewith, as is well known in the art. Additionally, in an embodiment, may include one or more virtual networks (VLANs). In particular, client 103 may access computing resources in the networked environment via the Internet, although the various servers 202, 203, 204 which support the networked environment may be configured as one or more local area networks or VLANs in communication with the Internet. However, a networked computing environment would not necessarily have to include the Internet, and might include some other network or networks, such as an internal network of a large business entity.

Although FIGS. 1 and 2 represent in simplified form a particular number of clients 103, virtual machines 102, hardware management console 202, server computer systems 203 and storage servers 204, it will be appreciated that the number of such devices could vary and is typically much larger. It will further be understood that, although various devices may appear identical for representational purposes in the figures, they do not necessarily have identical attributes. It will be further understood that the topology of network 201 is represented in simplified form for clarity of illustration, and that the actual topology of network communications may be far more complex, and may involve redundant networks and links, hierarchical network connections and/or any of various network configurations known in the art.

Computer System Hardware Components

Figure 3:
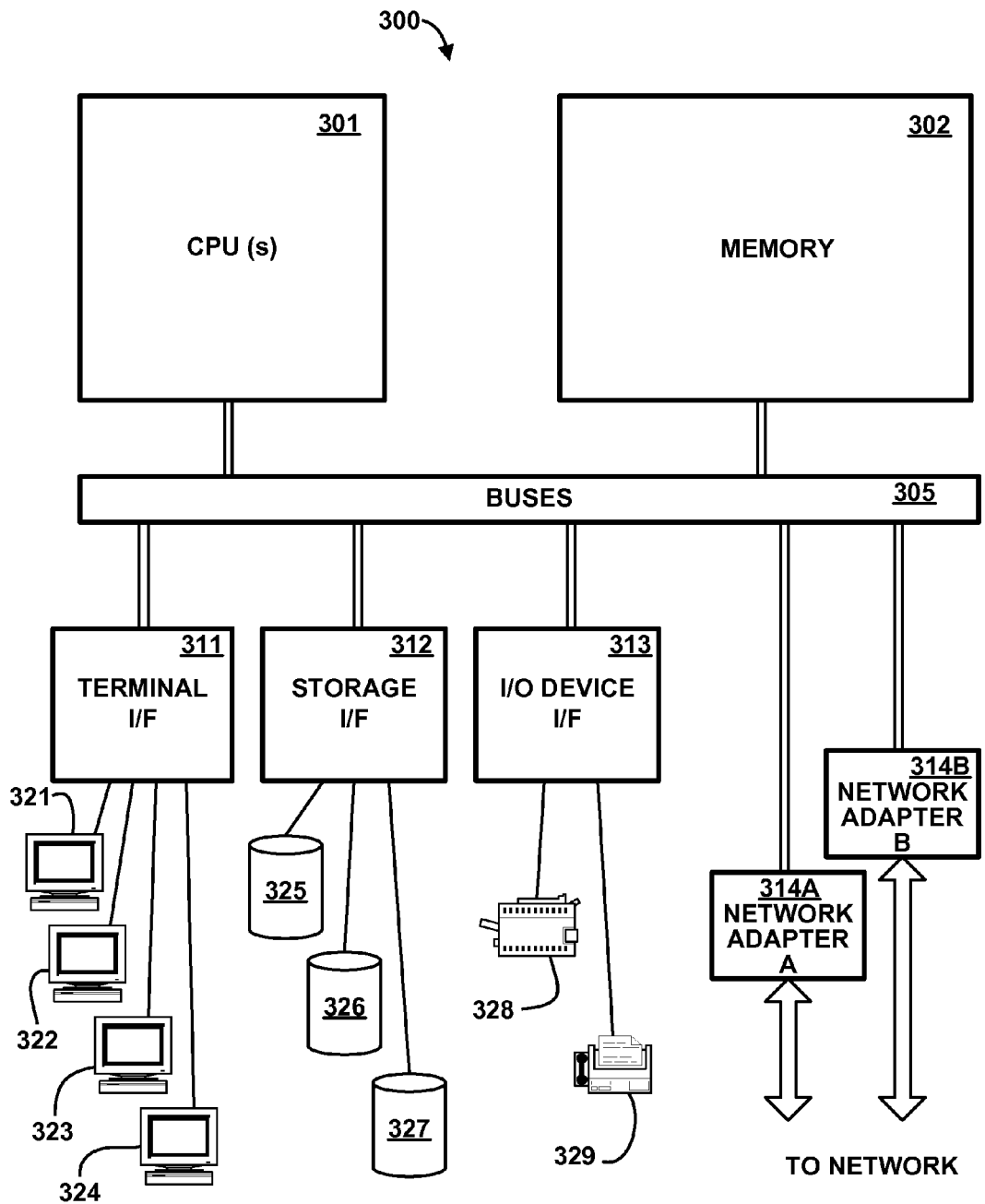
FIG. 3 is a high-level block diagram of the major hardware components of a representative general purpose computer system which could be used to perform the role of any of several functional elements, according to one or more preferred and/or alternative embodiments.

FIG. 3 is a high-level block diagram of the major hardware components of a representative general purpose computer system 300. In one or more embodiments, hardware management console 202 and server computer systems 203 are physically embodied as respective one or more general purpose computer systems, system 300 being a representation of any such general purpose computer system. Client 103 may also be embodied as a general purpose computer system.

Computer system 300 includes at least one general-purpose programmable processor (CPU) 301 which executes instructions and processes data from main memory 302. Main memory 302 is preferably a random access memory using any of various memory technologies, in which data is loaded from storage or otherwise for processing by CPU 301.

One or more communications buses 305 provide a data communication path for transferring data among CPU 301, main memory 302 and various I/O interface units 311, 312, 313, 314A, 314B, which may also be known as I/O processors (IOPs) or I/O adapters (IOAs). The I/O interface units support communication with a variety of storage and I/O devices. For example, terminal interface unit 311 supports the attachment of one or more user terminals 321-324. Storage interface unit 312 supports the attachment of one or more direct access storage devices (DASD) 325-327 (which are typically rotating magnetic disk drive storage devices, although they could alternatively be other devices, including arrays of disk drives configured to appear as a single large storage device to a host). I/O device interface unit 313 supports the attachment of any of various other types of I/O devices, such as printer 328 and fax machine 329, it being understood that other or additional types of I/O devices could be used. Network interface adapters 314A, 314B (herein generically referred to as feature 314) support connections to one or more external networks for communication with one or more other digital devices, and specifically to network 201 for communication with devices represented in FIG. 2. Network adapters 314 could support redundant connections to a single network, or could be coupled to separate networks, which may or may not be in communication with each other. While two network adapters 314 and network connections are shown, there may be only a single adapter and connection, or there could be more than two. Such external networks preferably include the Internet, and may include one or more intermediate networks, such as local area networks (not shown), through which communication with the Internet is effected.

It should be understood that FIG. 3 is intended to depict the representative major components of general purpose computer system 300 at a high level, that individual components may have greater complexity than represented in FIG. 3, that components other than or in addition to those shown in FIG. 3 may be present, that the number, type and configuration of such components may vary, and that a complex computer system will typically have more components than represented in FIG. 3. Several particular examples of such additional complexity or additional variations are disclosed herein, it being understood that these are by way of example only and are not necessarily the only such variations.

Although only a single CPU 301 is shown for illustrative purposes in FIG. 3, computer system 300 may contain multiple CPUs, as is known in the art. Although main memory 302 is shown in FIG. 3 as a single monolithic entity, memory 302 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures, as illustrated further in FIG. 4 and explained in greater detail herein. Although communications buses 305 are shown in FIG. 3 as a single entity, in fact communications among various system components is typically accomplished through a complex hierarchy of buses, interfaces, and so forth, in which higher-speed paths are used for communications between CPU 301 and memory 302, and lower speed paths are used for communications with I/O interface units 311-314. Buses 305 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 305 from various communications paths running to the various I/O devices, it would alternatively be possible to connect some or all of the I/O devices directly to one or more system buses.

Computer system 300 depicted in FIG. 3 has multiple attached terminals 321-324, such as might be typical of a multi-user "mainframe" computer system. Typically, in such a case the actual number of attached devices is greater than those shown in FIG. 3, although the present invention is not limited to systems of any particular size. Where computer system 300 is used exclusively as a hardware management console 202 or a server system 203 for performing work on behalf of remote clients 103, it may contain only a limited number of terminals, or even a single terminal, e.g., for use as a maintenance interface by a system administrator or the like, or in some cases no terminal at all, administrative functions being performed remotely. Furthermore, while certain functions are described herein for illustrative purposes as embodied in a single computer system, some or all of these functions could alternatively be implemented using a distributed network of computer systems in communication with one another, in which different functions or steps described herein are performed on different computer systems.

In accordance with one or more embodiments, hardware management console 202, server systems 203, and at least some clients 103, are general purpose computer systems capable of being programmed to execute a variety of different functions by loading and executing appropriate software. The functions described herein are performed by appropriate executable software modules installed in the corresponding computer systems. However, any of these devices could alternatively be special-purpose digital data devices for accomplishing the corresponding functions. For example, one or more of client devices may be any of various smart phones or portable devices capable of invoking remote computing functions through an on-board browser or limited browser function.

In accordance with one or more embodiments, each server system 203 comprises a non-uniform memory access (NUMA) or nodal computer system, also known as a Distributed Shared Memory (DSM) architecture, in which the CPU 301 is physically embodied as multiple CPUs each independently executing and maintaining respective state, and main memory 302 is physically embodied as multiple portions each associated with a respective CPU or subset of CPUs. Although any location in main memory is accessible to any CPU, access time vary, with access to the portion of memory associated with the accessing CPU being faster than access to a portion of memory which is not associated with the accessing CPU.

Figure 4:
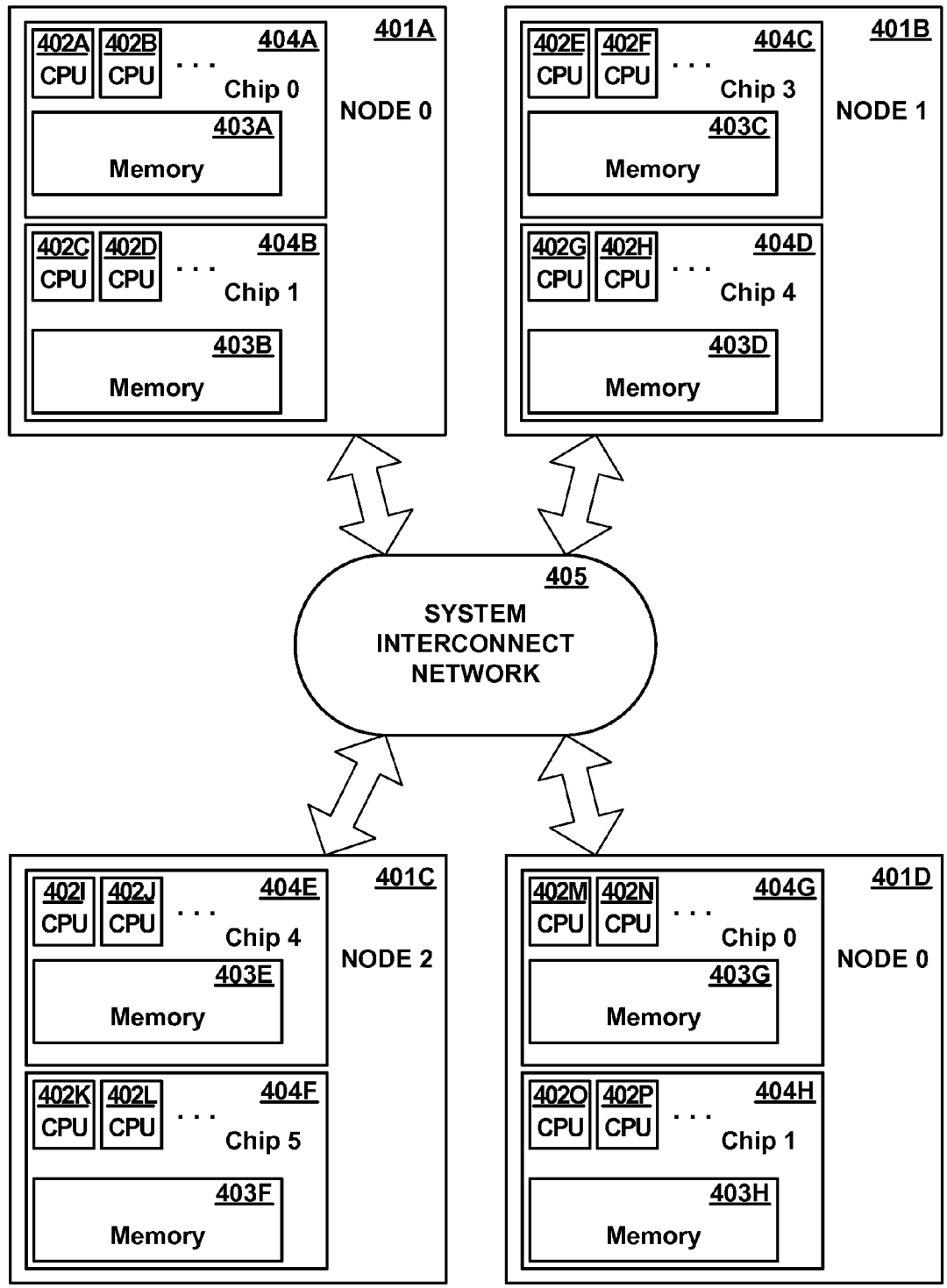
FIG. 4 is a high-level diagram of a nodal system architecture for a computer system, in accordance with one or more embodiments.

FIG. 4 is a high-level diagram of a nodal system architecture for a computer system, such as may be employed in any of server systems 203, in accordance with one or more embodiments. A nodal computer system architecture is simply one form of implementing a general purpose computer system 300 of FIG. 3, and in particular, implementing the processor 301 and memory 302, although the nodes may contain additional components.

Referring to FIG. 4, a nodal system comprises multiple nodes 401A-401D (herein generically referred to as feature 401), each node containing one or more processors 402A-402P (herein generically referred to as feature 402), and one or more portions of main memory 403A-403H (herein generically referred to as feature 403). Within a node, processors and memory are contained in integrated circuit chips 404A-H (herein generically referred to as feature 404). A system interconnect network 405 provides an internodal data communications path supporting communication of data among the various nodes.

A nodal system such as illustrated in FIG. 4 utilizes a distributed main memory, comprising separate local memory portions 403 in each node. Collectively, local memory portions 403 constitute the main memory 302 of the nodal computer system. The main memory is addressable using a single common real address space, which is shared by all CPUs 402 throughout the system. A respective portion of the real address space is allocated to each local memory portion 403 in a persistent, fixed manner. I.e., the address space allocation does not change with each thread, process, user or similar parameter, although it may be possible to change the allocation by reconfiguring the system. Thus, the real address space of main memory is constant across the system, and any memory location in a local memory 403 has a unique real address which is the same for all processors 402 and all nodes 401.

The nodes are connected to one another by a system interconnect network 405 that permits any node to communicate with any other node. The purpose of interconnect network 405 is to allow devices to communication across node boundaries, and in particular, to allow a processor in any node to access the memory portion 403 resident in any other node. Interconnect network 405 may employ any technique, now known or hereafter developed, for supporting communication among multiple nodes in a computer system. Ideally, the interconnect network medium should provide high bandwidth and low latency, and be scalable to allow for the addition of more nodes. Interconnect network 405 may be arranged as a set of point-to-point interconnection links, as a ring topology, as a common multi-drop bus topology, or in some other manner, and some communications may have to traverse one or more nodes or other devices to reach their respective destinations.

A node is a physical entity in which electronic components are mounted or packaged. In physical embodiment, a node could be any of an integrated circuit chip, multiple chips stacked or otherwise mounted together, a circuit card on which integrated circuit chips are mounted, multiple circuit cards mounted together in a drawer or similar packaging entity, or some other packaging arrangement. Whatever the physical embodiment, the node and the system interconnect network have the characteristic that data communications within the node are inherently faster than internodal data communications.

The physical configuration of processors and memory may be arranged in a single level of proximity (i.e., memory is either local to the processor or it is not), but in one or more embodiment the physical configuration may involve a hierarchy of proximity. FIG. 4 illustrates a simple example of such a hierarchy, in which each node 401 contains multiple integrated circuit chips 404, and each chip 404 contains multiple processors 402 and a respective portion of memory 403. In such a hierarchical configuration, not only is internodal data access slower than intranodal access, but within a node, data access within the same chip is faster than data access across a chip boundary. In this instance, the entities at lowest level of proximity, i.e., chips 404, are referred to as primary domains, while the entities at the higher level of proximity, i.e. nodes 401, are referred to as secondary domains.

It will be understood that additional levels of a memory access hierarchy could exist, i.e. tertiary domains, etc.

While various system components have been described and shown at a high level, it should be understood that a typical computer system contains many other components not shown, which are not essential to an understanding of the present invention.

Logical Partitioning of Computer System Resources

In the preferred embodiment, each server system 203 is logically partitionable into a plurality of virtual machines each executing on behalf of a respective client or performing administrative or other functions. Partitioning is a technique for dividing a single large computer system into multiple partitions, each of which behaves in some respects as a separate computer system. Computer system resources may be allocated in any of various ways for use by the virtual machines. A given resource may be allocated for exclusive use by a single particular virtual machine, or may be shared among all virtual machines (or some subgroup of virtual machines) on a time interleaved or other basis. Some resources may be allocated to respective particular virtual machines, while others are shared. Examples of resources which may be partitioned are CPU(s) 301, main memory 302, data storage within storage units 325-327, and network bandwidth. I/O adapters 311-314 are typically shared, although they could be partitioned as well. Each client accessing any of servers 203 executes its own tasks in the virtual machine partition assigned to the client, meaning that it can use only the system resources or share of resources assigned to that virtual machine, and not resources assigned to other virtual machines. Additionally, some virtual machines may be used for administrative, maintenance, and other functions, in particular the functions of a hardware management console 202 as described herein.

Virtual machine partitioning of resources is virtual rather than physical. Server computer systems 203 preferably have physical data connections such as buses running among different hardware components, allowing them to communicate with one another. These hardware resources may be shared by and/or allocated to different virtual machines. From a physical configuration standpoint, there is preferably no distinction made with regard to virtual machine partitions. The system's physical devices and subcomponents thereof are preferably physically connected to allow communication without regard to virtual machine partitions, and from this hardware standpoint, there is nothing which prevents a task executing in virtual machine A from writing to memory or storage allocated to virtual machine B.

Generally, allocation of resources to a virtual machine is enforced by a partition manager embodied as low-level encoded executable instructions and data, although there may be a certain amount of hardware support for virtual machine partitioning, such as special hardware registers which hold state information. The partition manager (and associated hardware, if any) prevent access by a virtual machine to the resources allocated to another virtual machine. Code enforcement of partitioning constraints generally means that it is possible to alter the virtual configuration of a partitioned computer system, i.e., to change the number of virtual machines or re-assign resources to different virtual machines, without reconfiguring hardware. In the preferred embodiment described herein, this low-level logical partitioning code is referred to as the "hypervisor".

Partitioning of a large computer system into multiple virtual machines has several potential advantages. As noted above, it is flexible in that reconfiguration and re-allocation of resources is easily accomplished without changing hardware. It isolates tasks or groups of tasks, helping to prevent any one task or group of tasks from monopolizing system resources. It facilitates the regulation of resources provided to particular users; this is important where the computer system is owned by a service provider which provides computer service to different users on a fee-per-resource-used basis. It may enable a single computer system to concurrently support multiple operating systems and/or environments, since each virtual machine can be executing a different operating system or environment. Finally, isolation of tasks and resources makes it more difficult for a process executing in one virtual machine to access resources in another virtual machine, thus providing greater security and data integrity.

Figure 5:
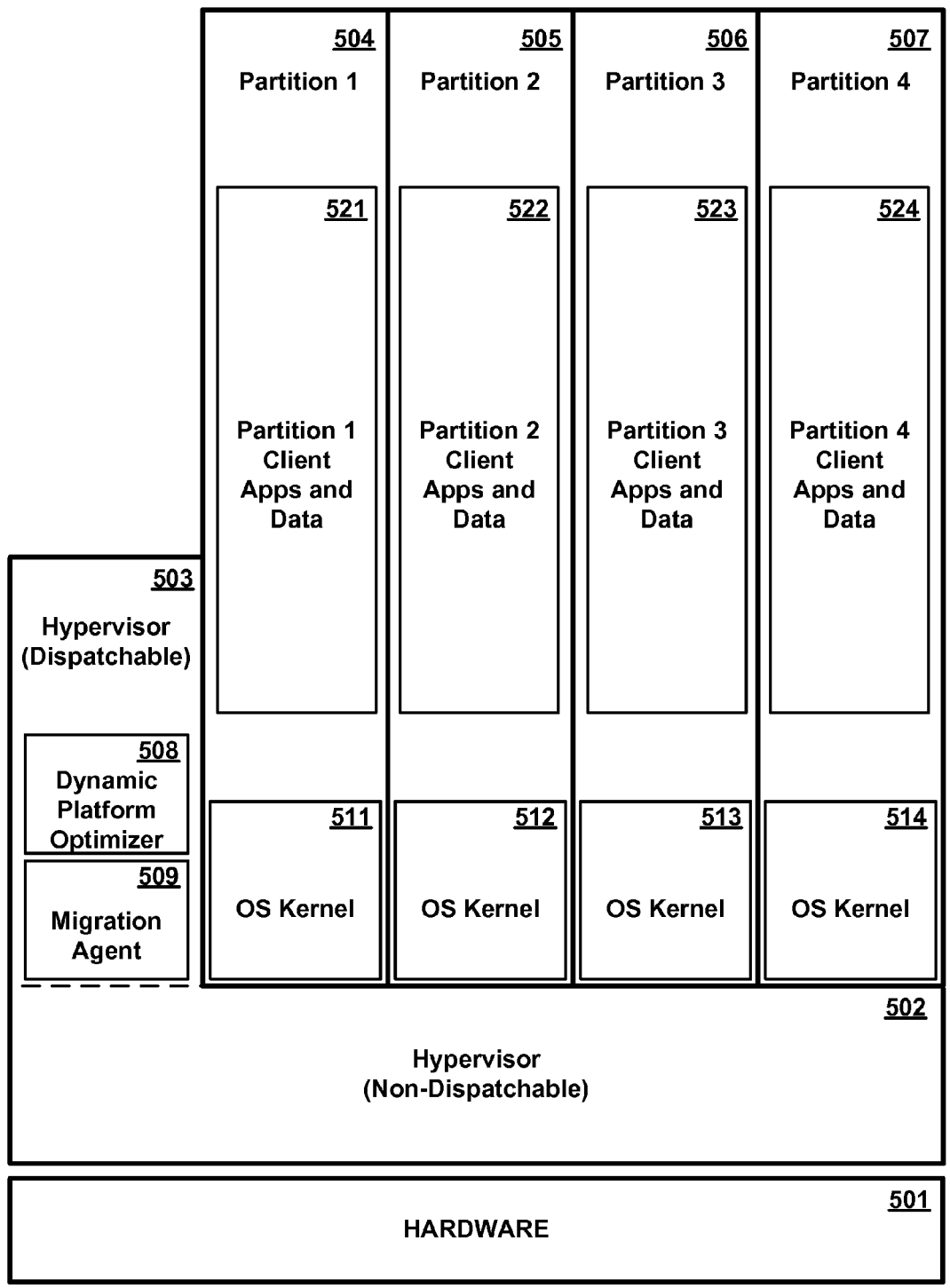
FIG. 5 is a conceptual illustration showing the existence of logical partitions at different hardware and software levels of abstraction in a server system, according to one or more embodiments.

FIG. 5 is a conceptual illustration showing the existence of manager code and virtual machine partitions at different hardware and software levels of abstraction in one of server systems 203. FIG. 5 represents a system having four client virtual machines in respective partitions 504-507, each executing one or more applications on behalf of the respective client. These are designated "Partition 1", "Partition 2", etc., it being understood that the number of partitions may vary. As is well known, a computer system is a sequential state machine which performs processes. These processes can be represented at varying levels of abstraction. At a high level of abstraction, a user specifies a process and input, and receives an output. As one progresses to lower levels, one finds that these processes are sequences of instructions in some programming language, which continuing lower are translated into lower level instruction sequences, and pass through licensed internal code and ultimately to data bits which get put in machine registers to force certain actions. At a very low level, changing electrical potentials cause various transistors to turn on and off. In FIG. 5, the "higher" levels of abstraction are generally represented toward the top of the figure, while lower levels are represented toward the bottom.

As shown in FIG. 5 and explained earlier, logical partitioning of machine resources is a code-enforced concept. In general, at the hardware level 501, partition boundaries do not exist (although there may be certain special purpose registers or other hardware used to identify partition boundaries or other virtual machine aspects). As used herein, hardware level 501 represents the collection of physical devices (as opposed to data stored in devices), such as processors, memory, buses, I/O devices, etc., shown in FIG. 3 and FIG. 4, possibly including other hardware not shown in FIG. 3 or FIG. 4. As far as a processor 402 is concerned, it is merely executing machine level instructions. While code can direct tasks in certain partitions to execute on certain processors, there is nothing in the processor itself which dictates this assignment, and in fact the assignment can be changed by the code. Therefore the hardware level is represented in FIG. 5 as a single entity 501, which does not itself distinguish among partitions.

Partition boundaries among the various partitions are enforced by a partition manager (also known as a "hypervisor"), consisting of a non-relocatable, non-dispatchable portion 502, and a relocatable, dispatchable portion 503. The hypervisor is super-privileged executable code which is capable of accessing resources, such as processor resources and memory, assigned to any partition. The hypervisor maintains state data in various special purpose hardware registers, and in tables or other structures in general memory, which govern boundaries and behavior of the partitions. Among other things, this state data defines the allocation of resources to partitions, and the allocation is altered by changing the state data rather than by physical reconfiguration of hardware.

In the preferred embodiment, the non-dispatchable hypervisor 502 comprises non-relocatable instructions which are executed by any of processors 402 just as instructions for tasks executing in the partitions. The code is non-relocatable, meaning that the code which constitutes the non-dispatchable hypervisor is at fixed real addresses in memory 302. Non-dispatchable hypervisor 502 has access to the entire real memory address range of the computer system, and can manipulate real memory addresses. The dispatchable hypervisor code 503 (as well as all code executing within a partition) is contained at addresses which are relative to an address range assigned to the partition in which it executes, and therefore this code is relocatable. The dispatchable hypervisor behaves in much the same manner as a client's partition, but it is hidden from the clients and not available to execute user applications. In general, non-dispatchable hypervisor 502 handles assignment of tasks to physical processors, memory mapping and partition enforcement, and similar essential tasks required to execute application code in a partitioned system, while dispatchable hypervisor 503 handles maintenance-oriented tasks, such as creating and altering partition definitions.

As represented in FIG. 5, there is no direct path between higher levels (levels above non-dispatchable hypervisor 502) and hardware level 501. While machine instructions of tasks executing at higher levels can execute directly on a processor 402, access to hardware resources is controlled by the non-dispatchable hypervisor. Non-dispatchable hypervisor 502 enforces partition boundaries of processor resources. I.e., task dispatchers at a higher level (the respective operating systems) dispatch tasks to virtual processors defined by the partition parameters, and the hypervisor in turn dispatches virtual processors to physical processors at the hardware level 501 for execution of the underlying task. The hypervisor also enforces partitioning of other resources, such as allocations of memory to partitions, and routing I/O to I/O devices associated with the proper partition.

Dispatchable hypervisor 503 performs many auxiliary system management functions which are not the province of any client partition. The dispatchable hypervisor generally performs higher level virtual machine management operations such as creating and deleting partitions, concurrent hardware maintenance, allocating processors, memory and other hardware resources to various partitions, etc. In particular, in one or more embodiments dispatchable hypervisor 503 includes a dynamic platform optimizer utility 508 which dynamically analyzes and adjusts system configuration parameters, and a migration agent 509 which handles migration of partitions from one server system 203 to another responsive to commands from the hardware management console, as explained in further detail herein.

Above non-dispatchable hypervisor 502 are a plurality of partitions 504-507. Each partition behaves, from the perspective of processes executing within it, as an independent computer system, having its own memory space and other resources, and for this reason is also referred to as a virtual machine. Each partition therefore contains a respective operating system kernel herein identified as the "OS kernel" 511-514. At the level of the OS kernel and above, each partition behaves differently, and therefore FIG. 5 represents the OS Kernel as four different entities 511-514 corresponding to the four different partitions. In general, each OS kernel 511-514 performs roughly equivalent functions. However, it is not necessarily true that all OS kernels 511-514 are identical copies of one another, and they could be different versions of architecturally equivalent operating systems, or could even be architecturally different operating systems. OS kernels 511-514 perform a variety of task management functions, such as task dispatching, paging, enforcing data integrity and security among multiple tasks, and so forth.

Above the OS kernels in each respective partition there may be any of various applications and data 521-524. In particular, for server systems 203 supporting partitions executing processes on behalf of remote clients 103, these are applications executing on behalf of the respective clients and associated data generated or used by those applications. Additionally, these applications could represent a hardware management console and associated applications and data, as further described herein with respect to FIG. 6. Although applications and data 521-524 have the same appearance in the conceptual representation of FIG. 5, it will be understood that in general each partition includes different applications and data.

While various details regarding a partitioned system architecture for supporting multiple virtual machines have been described herein as used in the preferred embodiment, it will be understood that many variations in the mechanisms used to enforce and maintain logical partitions are possible consistent with the present invention, and in particular that administrative mechanisms such as a non-dispatchable hypervisor, dispatchable hypervisor, and so forth, may vary in their design, or that some systems may employ some or none of these mechanisms, or that alternative mechanisms for supporting and maintaining multiple partitions may be present.

Hardware Management Console

Figure 6:
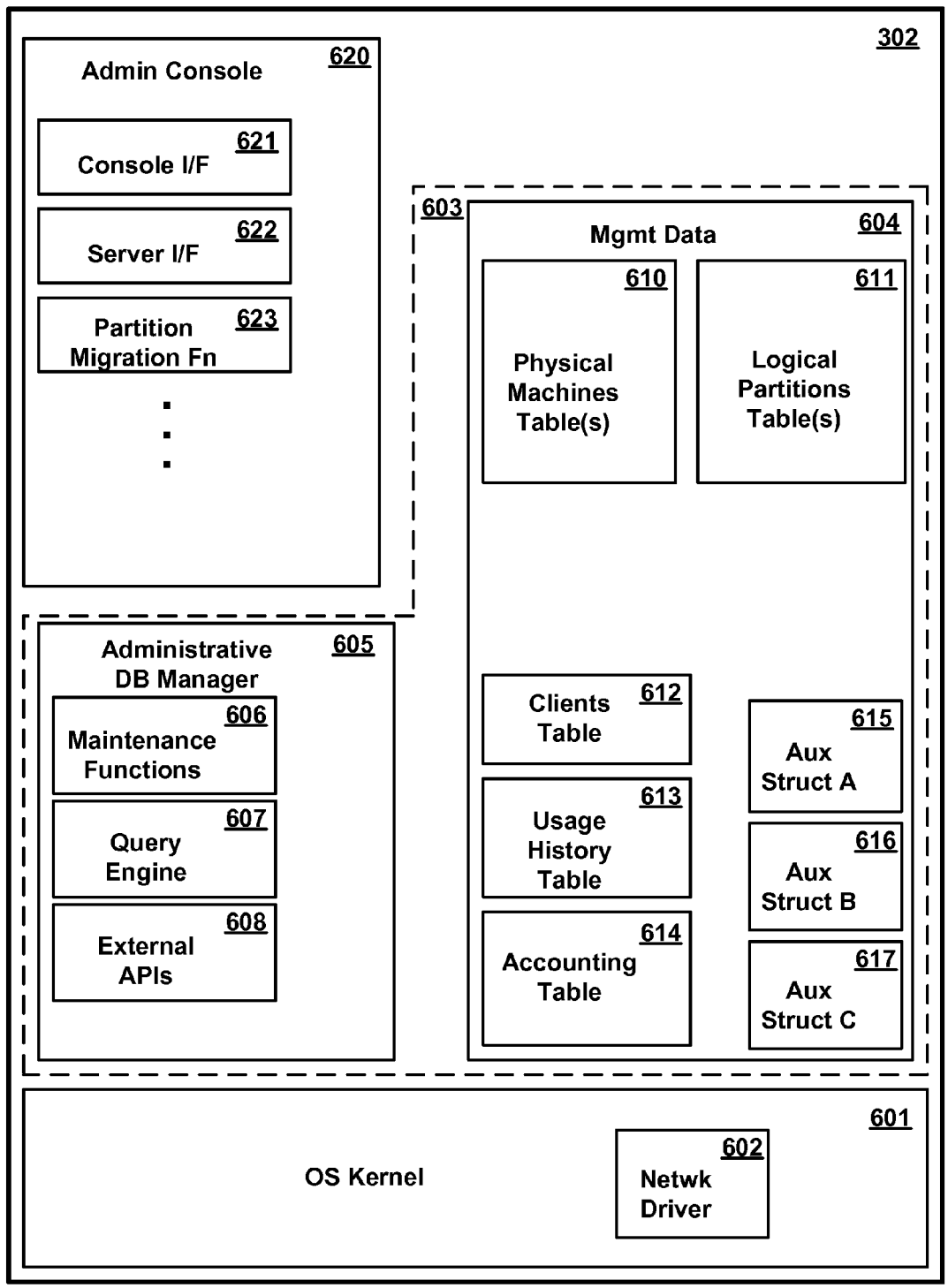
FIG. 6 is a conceptual illustration of the major software components of a computer system of FIG. 3 configured as a hardware management console, according to one or more embodiments.

FIG. 6 is a conceptual illustration of the major software components of computer system 300 in memory 302, configured to provide the function of a hardware management console 202, according to one or more embodiments. In one or more embodiments, the software components illustrated in FIG. 6 occupy a single partition (virtual machine) of a physical computer system 300 supporting multiple partitions; however, the illustrated components of a hardware management console could alternatively reside in an unpartitioned, dedicated physical machine, or could reside across more than one virtual machine or physical machine. Operating system kernel 601 is executable code and state data providing various low-level software functions, such as device interfaces, management of memory pages, management and dispatching of multiple tasks, etc. as is well-known in the art. In particular, OS kernel 601 includes one or more network adapter drivers 602 for handling communications with network 201 via network adapters 314. Administrative database 603 contains data structures and database management software for managing multiple servers 203 performing computing services on behalf of multiple clients 103, e.g., providing cloud computing services. Additionally, one or more software application programs collectively designated an administrative console application 620 executes various functions and accesses data in database 603 to provide the functions of a user interface for administrative personnel.

Administrative database 603 is preferably a structured relational database containing various management data structures 604 for maintaining server system state, identifying clients, tracking usage, and so forth, and an administrative database manager 605 for managing and accessing the data structures 604. In one or more embodiments, data structures 604 include at least one physical machines table 610, and at least one partitions table 611. Data structures 604 may include any of various additional tables containing data useful for managing servers 203 and providing services to clients 103, such as a clients table 612 containing entries corresponding to clients, usage history table 613 containing usage data, accounting table 614 containing accounting data for server usage, and additional tables (not shown). As is known in the database art, a database table is a data structure logically in the form of a table having multiple records (also called entries or tuples), each record having at least one, and usually multiple, fields (also called attributes). Although tables 610-613 are data structures which are logically equivalent to tables, they may be arranged in any suitable structure known in the database art. Data structures 604 may further include one or more auxiliary data structures 615-617, also sometimes referred to as metadata (of which three are represented in FIG. 6, it being understood that the number of such structures may vary). Auxiliary data structures characterize the structure of the database and data therein, and are useful in various tasks involved in database management, particularly in executing queries against the database. Examples of auxiliary data structures include database indexes, materialized query tables, histograms, index advice record, and so forth, it being understood that other types of metadata may exist.

Physical machines table(s) 610 is/are used to record the parameters of the application servers 203 (i.e., the physical machines) which perform the actual work on behalf of clients. Specifically, the physical machines table(s) include data recording the hardware configuration of each of the servers, including the number/amount of each type of resource and the relationship of resources to one another. While such information could be contained in a single table, it is more likely stored in multiple tables each corresponding to a different hardware resource or feature. For example, there may be a systems table containing one record for each physical server computer system 203, a nodes table containing one record for each node 401 within a system, a chips table containing one record for each chip 404 within a node, a network adapters table containing one record for each network adapter, and so forth. By such means, a complete hardware configuration of the multiple server systems 203 can be represented. Physical machine table(s) 610 illustrated in FIG. 6 is intended to encompass either a single or multiple tables, variously structured, which include hardware configuration data for the servers 203. In one or more embodiments, physical machines table(s) may include any or all of: a physical machine identifier (ID), one or more network addresses of the machine, one or machine capacities such as processor capacity, memory capacity, storage capacity, and so forth, one or more allocated capacities reflecting the amount of total capacity which has been allocated for use by existing clients, manufacturer and model of machine and various hardware components, ownership data, scheduled maintenance data, etc.

Partitions table 611 is used to record the parameters of logical partitions in the server computer systems 203 which have been allocated for use by respective clients. In general, each partition is allocated for use by a single client and is executed on a single physical machine, although in one or more alternative embodiments a single partition could be allocated for use by multiple clients. For example, a business may host a web server running on a partition which serves a large number of clients, and for which only some clients have authority to change the parameters of the logical partition. Partitions table 611 contains multiple records, each record corresponding to a respective partition within a server system 203. While partition information could be contained in a single table, it may alternatively be stored in multiple tables each corresponding to a different resource or feature associated with the partition. Partitions table(s) 611 illustrated in FIG. 6 is intended to encompass either a single or multiple tables, variously structured, which include essential partition data for the partitions within servers 203. Partitions table 611 may contains data such as a partition ID, a physical machine ID of the physical machine in which the partition resides, and a client ID of a client with which the partition is associated. Where multiple clients use a single partition, other or alternative data structures may be used to record the association of clients to partitions. Partitions table 611 may also contain various partition parameters defining the essential characteristics of the partition, such as numerical parameters specifying resource capacities allocated to the corresponding partition (e.g., processor capacity, memory capacity, storage capacity, etc.) as well as qualitative parameters such as an operating system platform or specific software resources available to the partition. The partition table records may contain any of various other or additional data useful to identify a partition and its attributes or perform essential operations. For example, additional fields may include a password or other authenticating data for accessing the partition, a time or creation/allocation or deletion/deallocation, priority of execution, and so forth.

Administrative database manager 605 is executable computer programming code which executes on CPU 301 to provide basic functions for the management of database 603. Database manager 605 may theoretically support an arbitrary number of database tables, which may or may not have related information, a specific number and structure of tables being shown in FIG. 6. Database manager 605 preferably contains administrative maintenance functions 606 allowing authorized users to perform basic administrative operations with respect to the database, such as defining and editing database table definitions, creating, editing and removing records in the database, viewing records in the database, defining database auxiliary data structures such as indexes and materialized query tables, and so forth. Certain of these functions may be available only to system administrators and the like, while others may be available to clients. Database manager 605 may further include a query engine 607 for executing queries against data in database tables 610-614. Database manager 605 may further include an external interface 608 having one or more application programming interfaces (APIs) by which external applications can access management data 604 either by invoking query engine 607 or through other means. Database manager 605 may further contain any of various more advanced database functions, as are known in the art. Database manager could be a generic database management system, such as one implementing a structured query language (SQL) query protocol, but it might alternatively query and structure data according to some other protocol and/or that it might be a custom designed database management system. Although database manager 605 is represented in FIG. 6 as an entity separate from operating system kernel 601, it will be understood that in some computer architectures various database management functions are integrated with the operating system.

Although one database 603 having five database tables 610-614 and three auxiliary structures 615-617 are shown in FIG. 6, the number of such entities may vary, and could be much larger. Additionally, database 603 may be logically part of a larger distributed database which is stored on multiple computer systems. Although administrative database manager 605 is represented in FIG. 6 as part of database 603, the administrative database manager, being executable code, is sometimes considered an entity separate from the "database", i.e., the data.

Memory 302 of a computer system 300 configured as a hardware management console 202 further includes administrative console application 620. Administrative console 620 is a set of computer programs or functions (i.e., executable computer programming code which execute on CPU 301) providing basic functions for the operation and maintenance of multiple server systems 203, which perform computing services on behalf of clients 103. In particular, the administrative console includes a console interface function 621, a server system interface function 622, a partition migration function 623, and any of various additional functions which may be necessary, such as workload assignment, accounting, and so forth (not shown).

Console interface function 621 provides an interactive user interface for one or more persons who maintain or manage the multiple server systems, such as system administrators or the like. This interactive user interface could be provided remotely over network 201 (which could include the Internet), or could be provided through attached terminals. In an alternative embodiment, interface function 521 may be an API to a remote program in the client (other than the browser).

Server system interface function 622 provides an interface for communicating with one or more server systems 203, and specifically for communicating information required for configuring and migrating partitions in the server systems to perform useful work on behalf of clients. Server interface 622 may communicate with low level hypervisor functions in the application server. It may communicate with a different physical server machine over network 201, or, in the case where the hardware management console is itself a virtual machine (partition) executing in one of the servers 203, it may communicate with low level hypervisor functions in the same physical machine.

Partition migration function 623 manages the selection of partitions to migrate and target systems to which the selected partitions are migrated. Partition migration function works in conjunction with dynamic platform optimizers 508 and migration agents 509 in each of the server systems 203. The actions performed by these various entities are explained in greater detail herein and further illustrated in FIGS. 7 and 8.

Various software entities are represented in FIG. 6 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representations of FIG. 6, it will be understood that the actual number of such entities may vary, and in particular, that in a complex cloud computing environment, the number and complexity of such entities is typically much larger. Additionally, although software components of hardware management console 202 are depicted in FIG. 6 on a single computer system (or single logical partition within a single physical computer system) for completeness of the representation, it is not necessarily true that all programs, functions and data will be present on a single computer system or will be performed on a single computer system. For example, accounting, billing and usage data might be maintained on a different system from that which manages allocation, deallocation, and migrations of partitions.

While the software components of FIG. 6 are shown conceptually as residing in memory 302, it will be understood that in general the memory of a computer system will be too small to hold all programs and data simultaneously, and that information is typically stored in data storage devices 325-327, comprising one or more mass storage devices such as rotating magnetic disk drives, and that the information is paged into memory by the operating system kernel as required. In particular, database tables 610-617 are typically too large to be completely loaded into memory, and typically only a portion of the total number of database records is loaded into memory at any one time. The full database 603 is typically recorded in disk storage 325-327. Furthermore, it will be understood that the conceptual representation of FIG. 6 is not meant to imply any particular memory organizational model, and that system 300 might employ a single address space virtual memory, or might employ multiple virtual address spaces which overlap.

Partition Migration Process

In one or more preferred embodiments, partition migration function 623 within hardware management console 202 manages the process of migrating one or more partitions from a source server computer system to one or more target server computer systems. In certain embodiments, the partition migration function may command the dynamic platform optimizer 508 in the source to determine a respective current performance optimization figure of merit for each partition in the source, and from this select a partition or partitions to be migrated. The partition migration function 623 further commands corresponding dynamic platform optimizers 508 in each of multiple candidate target servers systems to determine a respective projected performance optimization figure of merit for the target system, assuming the selected partition is migrated to it, and uses this data to select a target server system to receive the migrated partition. The partition migration function further commands respective migration agents 509 in the source and target(s) to migrate the selected partition(s). The dynamic platform optimizer 508 in each target pre-configures the target to receive the migrated partition.

Figure 7A:
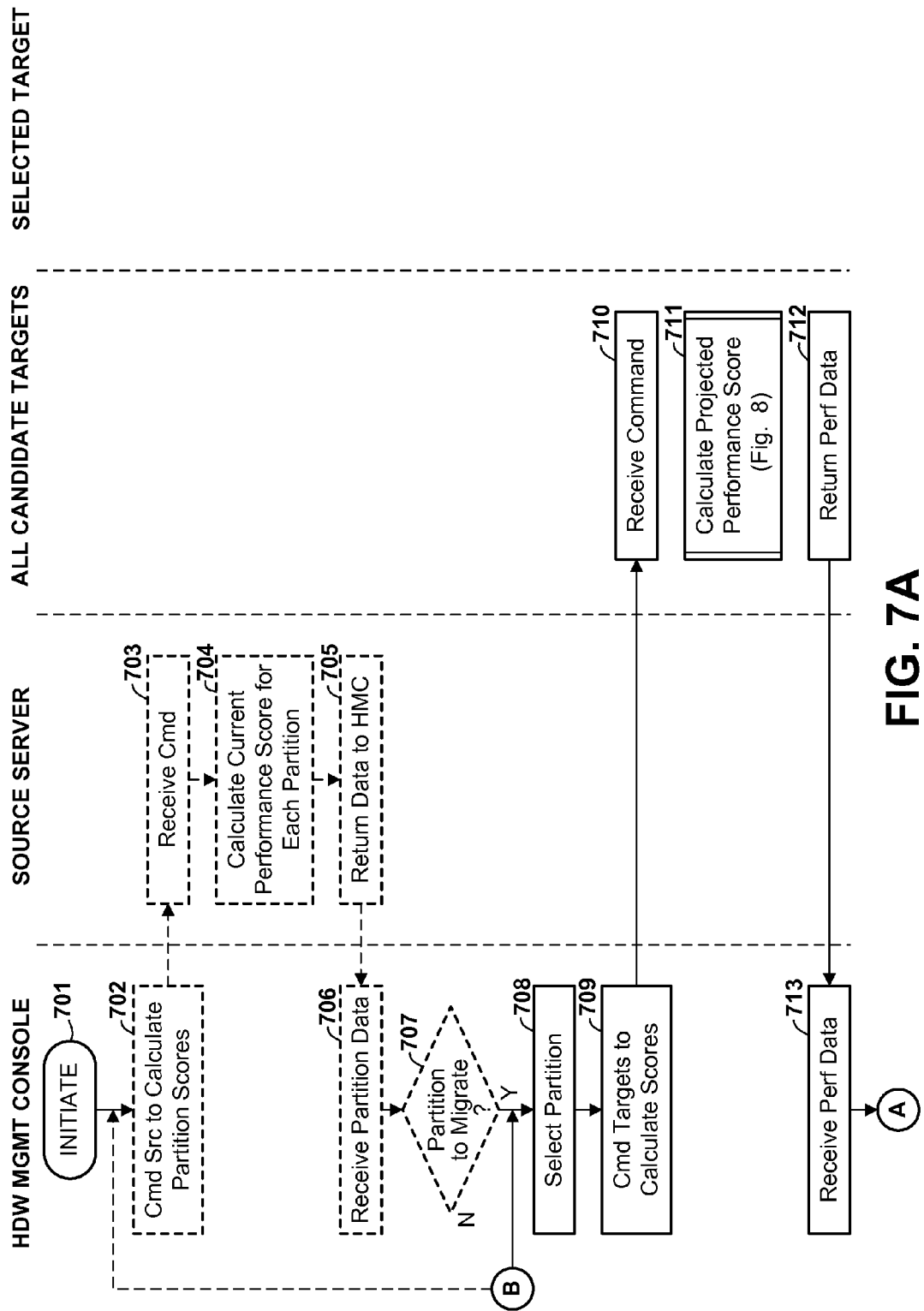
FIGS. 7A and 7B (herein collectively referred to as FIG. 7) are a flow diagram illustrating at a high level the process of migrating one or more partitions from a source server system to one or more target server systems, according to one or more embodiments.
Figure 7B:
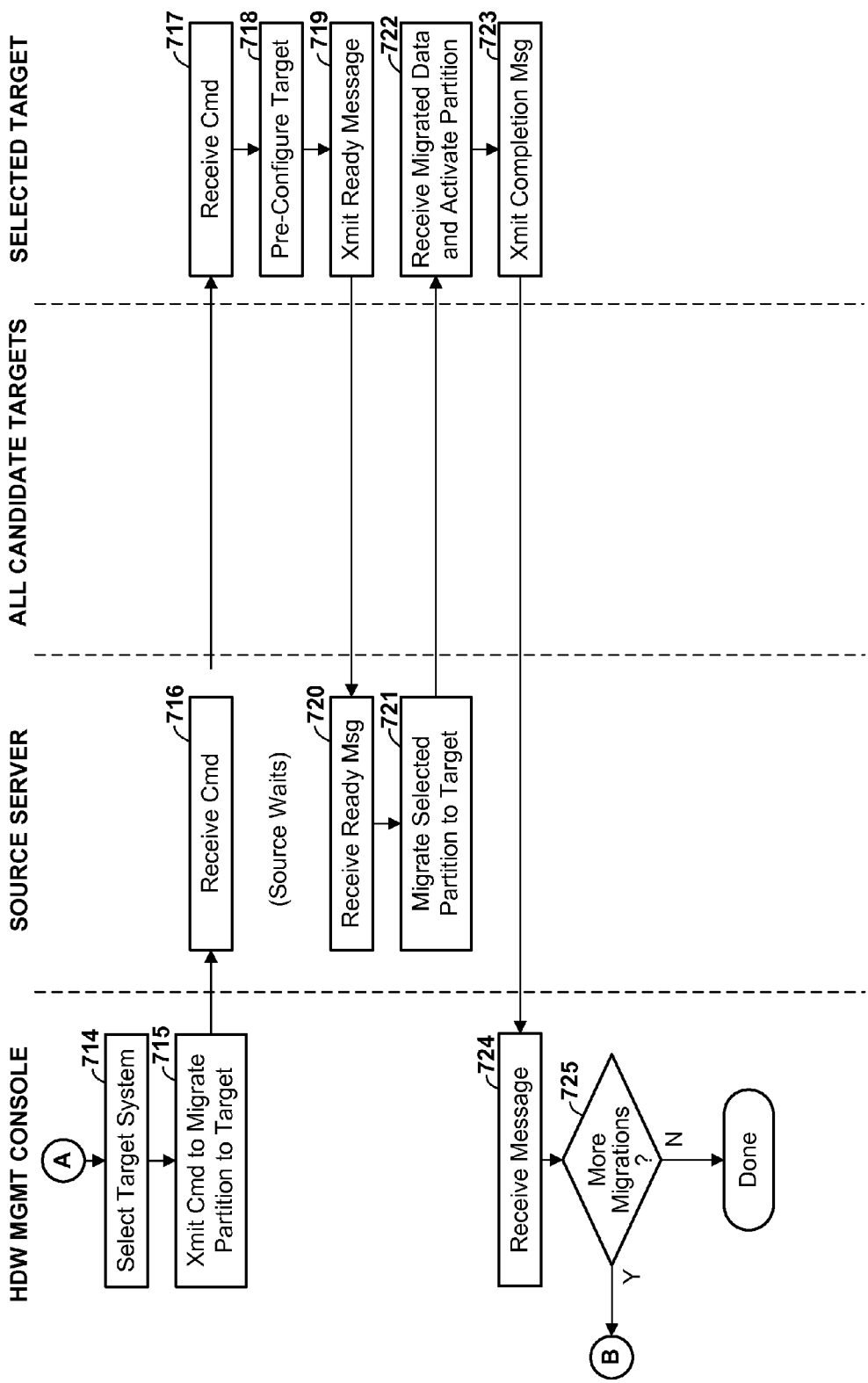

FIGS. 7A and 7B (herein collectively referred to as FIG. 7) are a flow diagram illustrating at a high level the process of migrating one or more partitions from a source server system to one or more target server systems, according to one or more embodiments. This process involves interaction among the hardware management console 202, the source server system from which one or more partitions are migrated, and multiple target server systems. In one or more preferred embodiments, this process is automatically performed in the hardware management console by the migration management function within the administrative console application, although in certain alternative embodiments certain steps or selections can be performed responsive to manual input, e.g., by a system administrator or the like. Certain actions are performed by all candidate target server systems, while addition actions are performed only by the target or targets, from among the set of candidates, which is/are chosen to receive the migrated partition or partitions. Actions performed by each of these entities are depicted in the respective columns of FIG. 7, separated by vertical broken lines. For clarity of illustration, actions performed by the candidate targets are shown in a column separate from the actions performed only by the selected target or targets, it being understood that the selected target(s) also perform the actions of a candidate target before being selected.

Referring to FIG. 7, a migration process is initiated in the hardware management console (block 701). The migration process may be initiated manually by a system administrator or the like, or may be initiated by an automated process executing in the hardware management console. If initiated by an automated process, it could be initiated due to previously scheduled maintenance operations to be performed on the source server system. It could also be initiated due to detection of a condition indicating poor resource allocation on one or more servers; for example, the servers may periodically transmit status information to the hardware management console, and if one or more servers is overloaded relative to the others, the hardware management console may initiate a migration of some of the workload from the overloaded server(s). There could be other causes for initiation of migration. When migration is initiated, a source server from which one or more partitions are to be migrated is designated.

In one or more embodiments and depending upon the circumstances under which migration is initiated, the hardware management console transmits a command to the source server to calculate a current performance optimization figure of merit for each partition in the source server system (block 702). Blocks 702-707 are performed to enable selection of a partition for migration from among multiple partitions in the source system, and in particular to select a partition currently having poor processor-memory affinity. Therefore, these steps are only performed for a selective migration, i.e. a migration of fewer than all the partitions. If all or substantially all of the partitions are to be migrated, e.g., because the source system is to be taken off line for maintenance, then it is unnecessary to perform blocks 702-707 to determine current processor-memory affinity, since the partitions will be migrated in any case.

The source server receives the command from the hardware management console (block 703), and responsive thereto, calculates a respective performance optimization figure of merit for each partition in the source system (block 704), the performance optimization figure of merit taking into account the current processor-memory affinity of the respective partition. In one or more preferred embodiments, the performance optimization figure of merit calculated at block 704 is that term of a system adjusted memory affinity score attributable to the respective partition as disclosed in copending U.S. patent application Ser. No. 13/675,701, published as U.S. Patent Publication 2014/0136800, which is herein incorporated by reference. However, it will be appreciated that any appropriate formula or technique which produces a figure of merit expressing performance optimization by taking into account the processor-memory affinity of the partition could alternatively be used. For example, a figure of merit might alternatively be produced by sampled measurements during execution which determine a frequency of internodal memory accesses attributable to the partition. The source system then returns the performance data thus computed (block 705), which is received in the hardware management console (block 706).

The hardware management console may make a determination whether to migrate any partitions, illustrated as block 707. This determination may depend on the current performance optimization score received. For example, if the scores are all better than some performance threshold, the hardware management console may determine not to migrate any partitions, shown as the 'N' branch from block 707, in which case the migration process ends. If a determination is made to migrate a partition, the 'Y' branch is taken from block 707 to block 708.

The hardware management console then selects a partition to be migrated (block 708). If blocks 702-707 were performed, e.g., because only selective partitions are to be migrated, the hardware management console selects a partition based on the current performance optimization figures of merit of the various partitions in the source system. In one or more embodiments, the administrative console application automatically selects the partition having the worst performance optimization score. In one or more alternative embodiments, the administrative console application may take into account additional criteria, such as partition size. If blocks 702-707 were not performed, the administrative console application automatically selects partition based on any appropriate data available to the hardware management console. For example, if substantially all of the partitions are to be migrated from the source system, the administrative console application would typically select the "largest" partition, i.e., that partition requiring the most resources. Since partitions require different types of resources (processor, memory, storage, etc.), the various resource types could be weighted in accordance with any appropriate criteria to determine "largest". In one or more alternative embodiments, a system administrator or the like may manually specify a partition to be selected.

The hardware management console then transmits a command to each of multiple candidate target server systems to determine a projected performance optimization figure of merit for the respective candidate target server system, assuming the selecting partition is migrated to the respective candidate target server system (block 709). In one or more embodiments, the "candidate target server systems" comprise all server systems 203 within the cloud computing environment or other multiple server system environment managed by hardware management console 202 (with the exception of the source server system). However, in one or more alternative embodiments, the candidate target servers could be fewer than all of the server systems. For example, the administrative console application could filter some server systems from the pool of candidates based on current server system load. Alternatively, some server systems could be filtered out based on network topology, as, for example, if network 201 is constructed as multiple local area networks in communication with one another, the candidate target server systems might be limited to a single local area network.

The candidate target servers each receive the command from the hardware management console (block 710), and responsive thereto, each calculate a respective projected performance optimization figure of merit for the corresponding candidate target system, on the assumption that the target will include the partition selected to be migrated as well as all partitions currently supported in the target (block 711). The performance optimization figure of merit takes into account the projected processor-memory affinity obtainable for the target system once the selected partition has been migrated to it. In one or more preferred embodiments, the projected performance optimization figure of merit calculated at block 711 is a change in the aggregate system adjusted memory affinity score for the target system as disclosed in copending U.S. patent application Ser. No. 13/675,701, published as U.S. Patent Publication 2014/0136800, which is herein incorporated by reference, after making certain configuration assumptions for placing the partition to be migrated and/or altering existing partitions in the target system. However, it will be appreciated that any appropriate formula or technique which produces a projected figure of merit expressing projected performance optimization by taking into account the projected processor-memory affinity of the target system after moving the selected partition could alternatively be used. Each candidate target system then returns the projected performance data thus computed (block 712), which is received in the hardware management console (block 713).

The projected performance optimization figure of merit computed at block 711 involves assumptions about the configuration of the candidate target system after the selected partition has been migrated to it. In one or more variations, the configuration assumptions for moving the partition to be migrated to the target are or include that resources are allocated to the partition to be migrated in a manner to achieve optimal processor-memory affinity of the migrated partition, subject to the constraint that the resource allocation of any partition currently executing in the target system are not altered. In one or more other variations, the configuration assumptions are or include altering the resource configuration of currently executing partitions in the target system to achieve a best projected performance optimization figure of merit for the aggregate target system. A process for determining a best configuration and corresponding figure of merit in the candidate target system in accordance with one or more embodiments is shown in greater detail in FIG. 8.

Figure 8:
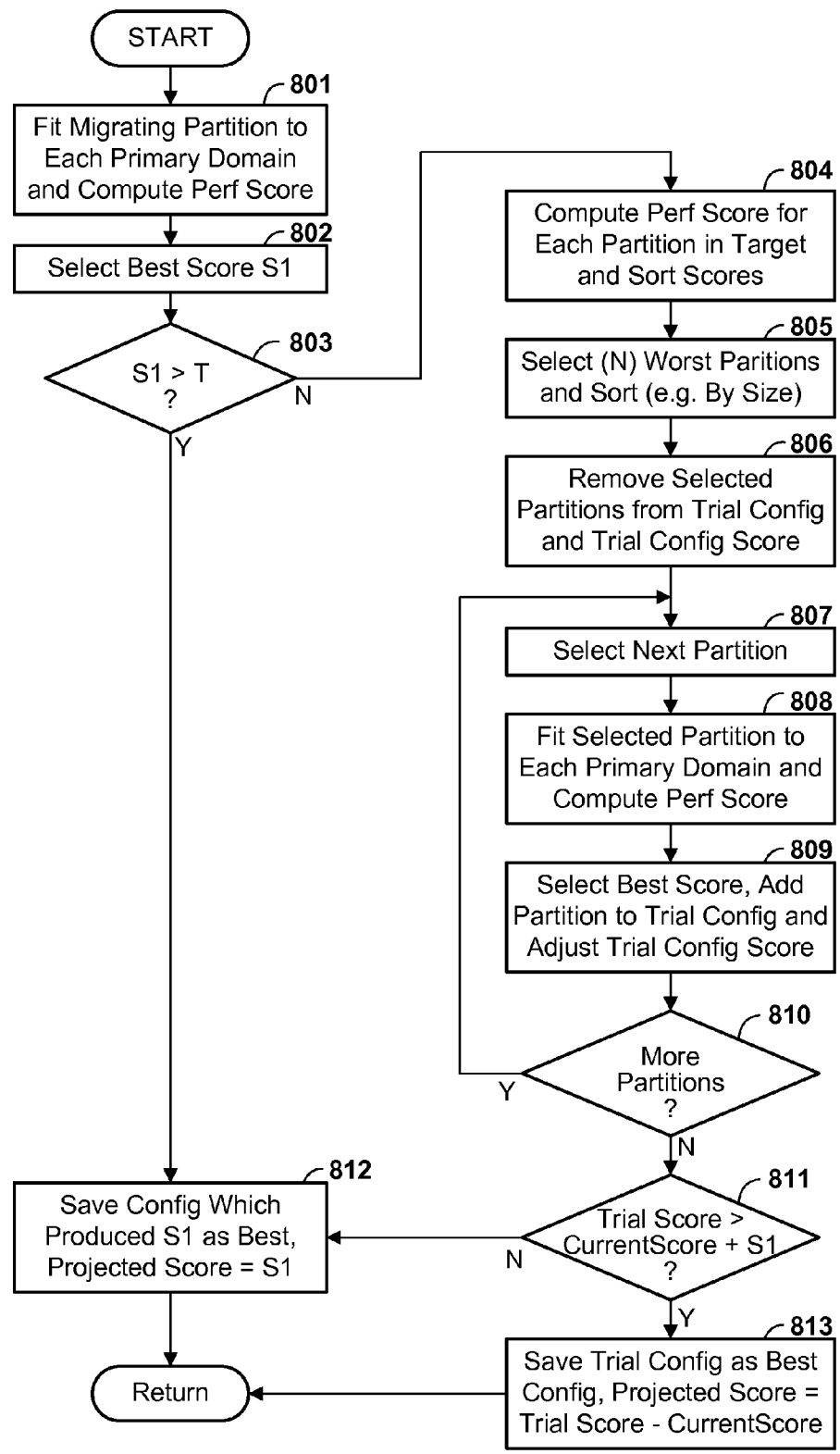
FIG. 8 is a flow diagram illustrating at a high level a process of determining an optimal placement and corresponding projected performance optimization for placing a partition to be migrated on a candidate target system, according to one or more embodiments.

Referring to FIG. 8, a flow diagram illustrating at a high level a process of determining an optimal placement and corresponding projected performance optimization for placing a partition to be migrated on a candidate target system performed by a dynamic platform optimizer 508 in the target, according to one or more embodiments, is shown. The process illustrated in FIG. 8 is intended to achieve a good configuration in most instances by use of certain heuristics, without necessarily being perfect. It will be understood that the number of possible permutations of different configurations in a target is often too large for exhaustive analysis or the overhead of analysis too large to justify marginal improvements in performance. Different heuristics or techniques could produce different results.

Upon being directed to determine an optimal placement and corresponding projected performance optimization figure of merit for a hypothetical partition to be migrated, dynamic platform optimizer 508 determines, for each primary domain in the target system, a hypothetical best fit placement of the partition to be migrated in that primary domain and corresponding performance optimization figure of merit (block 801). I.e. it hypothetically allocates the migrating partition to the respective primary domain and attempts to fit all migrating partition resources in the respective primary domain or as near to it as possible, without altering any existing allocations or assignments for other partitions currently in the target system. A respective projected performance optimization figure of merit, designated S1, is computed for each such hypothetical placement in a respective primary domain. In one or more preferred embodiments, S1 is the component of the adjusted memory affinity score for the hypothetical configuration attributable to the migrating partition, computed as disclosed in copending U.S. patent application Ser. No. 13/675,701, published as U.S. Patent Publication 2014/0136800, which is herein incorporated by reference, it being understood that other formulae could be used. The dynamic platform optimizer then selects the hypothetical configuration for the migrating partition having the highest score S1 (block 802).

If the S1 score selected at block 802 exceeds a predetermined threshold T, then the hypothetical placement is deemed sufficiently good that no further analysis is necessary, and the 'Y' branch is taken from block 803 to block 812. At block 812, the score S1 and hypothetical configuration which produced it are saved as the projected performance optimization figure of merit and corresponding optimal placement for placing the migrating partition in the target system, and the process returns.

If the S1 score selected at block 802 does not exceed threshold T, the hypothetical placement obtained from blocks 801 and 802 is not considered a good placement, although it may still be the best available. In this case, the 'N' branch is taken from block 803. The dynamic performance optimizer will attempt to find a better placement by reconfiguring one or more existing partitions in the target system.

The purpose of the comparison at block 803 is to avoid the overhead of finding another configuration when simply adding the partition being migrated to the target as currently configured (i.e., without altering the configuration of any existing partition in the target) produces an acceptable result. However, in one or more alternative embodiments, the comparison at block 803 is omitted, and control flows directly from block 802 to block 804. In other words, the dynamic performance optimizer will always attempt to find a better configuration, even if the current configuration is good.

The dynamic performance optimizer computes a performance optimization score component for each partition currently in the target system, and sorts the scores thus computed (block 804). In one or more preferred embodiments, these performance optimization scores are computed using the same formula as used in block 801, but applied to the current partitions instead of a hypothetical configuration of the migrating partition.

The partitions having the worst performance scores are then selected and sorted (along with the migrating partition) according to a priority of placement criterion (block 805). In one or more embodiments, the N partitions having the worst performance scores are selected, where N is a fixed integer or represents some fixed proportion of the total number of partitions. In one or more alternative embodiments, all partitions having a performance score below some pre-determined threshold are selected. Alternatively, a combination of these criteria could be used, such as all partitions below a pre-determined threshold, until a fixed maximum number is reached. In one or more embodiments, the priority of placement criterion is a measure of partition size, such as the number of processors required by the partition, the amount of memory allocated to it, or a combination thereof, it generally being preferred that the largest partitions according to the applicable criterion will have the highest priority of placement, i.e., will be placed first.

The selected partitions are then hypothetically removed from the current configuration to produce a trial configuration, and a performance optimization figure of merit is computed for the trial configuration (block 806). In one or more preferred embodiments, this performance optimization figure of merit for the trial configuration is the aggregate system adjusted memory affinity score for the trial configuration as disclosed in copending U.S. patent application Ser. No. 13/675,701, published as U.S. Patent Publication 2014/0136800, which is herein incorporated by reference.

The dynamic performance optimizer 508 then selects the next partition of the group which was sorted in block 805, according to the placement priority (block 807). The dynamic platform optimizer determines, for each primary domain in the target system, a hypothetical best fit placement of the partition selected at block 807 in that primary domain and corresponding performance optimization figure of merit, assuming that the target system is configured according to the trial configuration (block 808). I.e. it hypothetically allocates the selected partition to the respective primary domain and attempts to fit all selected partition resources in the respective primary domain or as near to it as possible, assuming the trial configuration of the target system. A respective projected performance optimization figure of merit, designated S2, is computed for each such hypothetical placement in a respective primary domain, which is preferably the same component of the adjusted memory affinity score for the hypothetical configuration attributable to the selected partition, computed as in block 801. The best score S2 is then selected, the trial configuration is updated by assigning the selected partition to the primary domain and resources under which the best score S2 was calculated, and the trial configuration score is incremented by S2 (block 809).

If any more partitions remain in the set of partitions which was sorted by placement priority in block 805, the 'Y' branch is taken from block 810, and a next priority partition is selected at block 807. When all partitions of the set have been thus hypothetically placed, the 'N' branch is taken from block 810.

The dynamic performance optimizer then compares the projected performance optimization of the configuration produced by blocks 801-802 with that produced by blocks 804-810. I.e., if compares the resultant trial configuration score produced by blocks 804-810 with the sum of S1 and the performance optimization score of the system as currently configured. If the trial configuration score is not greater than the current configuration score plus S1, the 'N' branch is taken from block 811 to block 812, and the score S1 and hypothetical configuration which produced it are saved as the projected performance optimization figure of merit and corresponding optimal placement for placing the migrating partition in the target system. If the trial configuration score is greater, the 'Y' branch is taken to block 813. In this case, the trial configuration is saved as the optimal placement for placing the migrating partition, and the trial configuration score less the performance optimization score for the target as current configured is saved as the projected performance optimization figure of merit. Since the trial configuration will involve some movement of currently existing partitions and associated overhead, in one or more embodiments the comparison performed at block 811 may require that the trial configuration score exceed the sum of current score+S1 by some predetermined delta.

Referring again to FIG. 7, after the candidate targets systems return their respective performance optimization figures of merit to the hardware management console, the hardware management console selects one of the candidate target systems to receive the partition to be migrated (block 714). I.e., preferably the selection is automatically performed by the administrative console application executing in the hardware management console. This selection is based at least in part on the performance optimization figures of merit, and in one or more embodiments, the target system returning the highest figure of merit is selected, although it would alternatively be possible to take additional factors into account.

The hardware management console then sends a command to the selected target system to prepare to receive the selected partition, and at approximately the same time, sends a command to the source to migrate the selected partition to the selected target (block 715). Depending on the type of network 201, this may in fact be a single message which is broadcast. The source receives the message and waits until the selected target indicates it is ready (block 716). The selected target receives the command (blocks 717), and responsive thereto, pre-configures the selected target system according to the configuration upon which its performance optimization figure of merit, computed previously at block 711, was based (block 718). When the selected target system is ready, it sends a message to the source to begin migration (block 719). The source receives the target's message (block 720), and migrates the selected partition to the target using an appropriate migration sequence (block 721), while the target receives the migrated data and reconstructs the partition (block 722). Typically, migration illustrated as blocks 721 and 722 may involve multiple stages as a partition's data is transmitted and processes executing in the source are suspended/completed in the source and re-activated in the target. Such migration processes are known in the art.

Pre-configuration of the target at block 718 and migration of the selected partition at block 721 and 722 may take some time, and although shown in FIG. 7 as occurring sequentially, in one or more embodiments, they may in fact overlap. The selected target may send its ready message at block 719 before completing pre-configuration. For example, the target may initially allocate storage space and begin to store certain files of the migrated partition, before all existing partitions on the target have been re-configured. In one or more alternate embodiments, the configurations of currently executing partitions on the target system are not altered before migration.

When the partition has been successfully migrated, the selected target notifies the hardware management console (block 723). The hardware management console receives the notification (block 724). If there are additional partitions to be migrated from the source, the 'Y' branch is taken from block 725 to either block 702 or 708. The optional path to block 702 may be performed in circumstances where only a limited number of partitions will be migrated, and the performance optimization figures of partitions remaining on the source might be altered as a result of a previous partition migration from the source. When no more partitions remain to be migrated, the 'N' branch is taken from block 725, and the migration process ends.

Although the migration process is shown in FIG. 7 as occurring one partition at a time, it would alternatively be possible to migrate multiple partitions in parallel to multiple targets. This alternative may particularly be desirable where substantially all partitions are being migrated from the source, and it is not necessary to determine whether a partition will be migrated.

Other Embodiments and Variations

Although a series of steps has been described above as one or more preferred and/or alternative embodiments, it will be appreciated that many variations of processes for managing multiple server systems are possible. In particular, some steps may be performed in a different order, different data structures may be used, and/or different hardware or software resources may be employed to perform functions described herein.

In the various embodiments described above, the administrative data in the hardware management console 202 takes the form of records in a relational database which are accessed using general-purpose database search tools. However, in general administrative data might be anything which records the information necessary to manage resources in the cloud or other multiple server environment, and need not be records in a relational database. For example, physical machine records and/or client records and/or partition records might be nothing more than one or more lists. Furthermore, the partition records might be merged with the client records, particularly if a client is permitted to have only a single partition. Other data structures would alternatively be possible.

In general, the routines executed to implement the illustrated embodiments of the invention, whether implemented as part of an operating system or a specific application, program, object, module or sequence of instructions, including a module within a special device such as a service processor, are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product embodied in non-transitory computer-readable media, and the invention applies equally regardless of the form of distribution. Examples of non-transitory computer-readable media include, but are not limited to, volatile and non-volatile memory devices, floppy disks, hard-disk drives, CD-ROM's, DVD's, and magnetic tape, it being understood that these examples are not exhaustive. Examples of non-transitory computer-readable media are illustrated in FIG. 3 as system memory 302 and data storage devices 325-327.

Unless inconsistent with the invention or otherwise qualified herein, computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute as a stand-alone software package or in conjunction with other program code, and may execute entirely on a single machine or on multiple computers connected in a distributed fashion. Multiple computers may be connected to one another through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the non-transitory computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although a specific embodiment of the invention has been disclosed along with certain alternatives, it will be recognized by those skilled in the art that additional variations in form and detail may be made within the scope of the following claims:

What is claimed is:

1. A method for migrating workload from a source server computer system to at least one of a plurality of candidate target server computer systems, comprising:
 determining at least one candidate workload unit for migration from said source server computer system;
 for each said candidate workload unit, generating a respective projected performance optimization representation for each of said plurality of candidate target server computer systems, each respective projected performance optimization representation being a numerical figure of merit representing a respective projected performance optimization obtainable by migrating the respective candidate workload unit to the respective candidate target server computer system, the respective projected performance optimization being dependent at least in part on a projected processor-memory affinity resulting from migrating the respective candidate workload unit to the respective candidate target server computer system, wherein said projected processor-memory affinity comprises at least one parameter projecting an extent to which data required for executing a process or thread on a processor of a non-uniform memory access computer system is held in a main memory portion of the non-uniform memory access computer system which is physically closest to the processor executing the process or thread, wherein said generating a respective projected performance optimization representation for each of said plurality of candidate target server computer systems comprises determining a respective optimum workload unit configuration for each of said plurality of candidate target server computer systems, wherein, for at least one candidate target server computer system, the respective optimum workload unit configuration alters the configuration of one or more existing workload units in the respective candidate target server computer system, wherein for at least one candidate target server computer system, said determining a respective optimum workload unit configuration comprises: (a) generating a respective projected performance optimization representation for each of a plurality of hypothetical configurations of the respective candidate target server computer system, each respective projected performance optimization representation representing a projected relative performance optimization obtainable by migrating the respective candidate workload unit to the respective candidate target server computer system configured according to the respective hypothetical configuration, the projected performance optimization representation being dependent at least in part on a projected processor-memory affinity resulting from migrating the respective candidate workload unit to the respective candidate target server computer system configured according to the respective hypothetical configuration; and (b) determining a respective optimum workload unit configuration for the respective candidate target server computer system by selecting one of the plurality of hypothetical configurations of the respective target server computer system according to the projected performance optimization representations for the hypothetical configurations of the respective target server computer system;

for each of a plurality of said candidate workload units, generating a respective current performance optimization representation, each respective current performance optimization representation representing a relative performance optimization of the corresponding candidate workload unit as currently configured in the source server computer system;

selecting at least one said candidate workload unit for migration from said source server computer system using the current performance optimization representation generated by said generating a respective current performance optimization representation;

selecting a respective target server computer system to which each of at least one said candidate workload unit is migrated from among said plurality of candidate target server computer systems using the projected performance optimization representation;

migrating each at least one candidate workload unit to the respective target server computer system selected by said selecting at least one respective target server computer system to which each of at least one said candidate workload unit is migrated; and if said selecting a respective target server computer system to which each of at least one said candidate workload unit is migrated from among said plurality of candidate target server computer systems using the projected performance optimization representation selects a first target server computer system for which the respective optimum workload unit configuration alters the configuration of one or more existing workload units, then altering at least one configuration parameter of at least one existing workload unit in the first target server computer system according to respective optimum workload unit configuration before migrating the corresponding candidate workload unit selected for migration to the first target server computer system;

wherein said source server computer system and said candidate target server computer systems are server systems within a cloud computing environment for providing cloud computing services to a plurality of clients;

wherein said selecting a respective target server computer system to which each of at least one said candidate workload unit is migrated from among said plurality of candidate target server computer systems using the projected performance optimization representation is performed in an administrative system which manages said source server computer system and said plurality of candidate target server computer systems, and wherein said for each said candidate workload unit, generating a respective projected performance optimization representation for each of said plurality of candidate target server computer systems is performed respectively in each candidate target server computer system and the respective results are communicated to said administrative system.

2. The method of claim 1, wherein each said candidate workload unit is the workload of a respective logical partition of said source server computer system, and wherein migration of a candidate workload unit to a target server computer system comprises migration of the corresponding logical partition to the target server computer system.

* * * * *